United States Patent
Yoon et al.

(10) Patent No.: US 8,473,184 B2
(45) Date of Patent: Jun. 25, 2013

(54) CONTROL METHOD FOR DECELERATION OF VEHICLE INCLUDING CONTINUOUS VALVE LIFT APPARATUS AND SYSTEM FOR THE SAME

(75) Inventors: Maru Yoon, Seoul (KR); Hakmo Yoo, Suwon (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 906 days.

(21) Appl. No.: 12/568,392

(22) Filed: Sep. 28, 2009

(65) Prior Publication Data
US 2010/0139618 A1 Jun. 10, 2010

(30) Foreign Application Priority Data
Dec. 5, 2008 (KR) .................. 10-2008-0123582

(51) Int. Cl.
*G06F 19/00* (2011.01)
*G06G 7/70* (2006.01)
*F02D 13/04* (2006.01)
*B60W 10/18* (2012.01)

(52) U.S. Cl.
USPC ........... 701/110; 701/112; 123/321; 123/325; 123/332; 123/345; 477/203

(58) Field of Classification Search
USPC ............... 123/320, 321, 322, 325, 332, 333, 123/345, 346, 349, 361, 371, 198 DB, 198 F; 701/110, 112; 477/203, 204, 205, 206, 207
See application file for complete search history.

(56) References Cited

U.S. PATENT DOCUMENTS

| | | | | |
|---|---|---|---|---|
| 3,331,478 A | * | 7/1967 | Trifiletti et al. | 477/207 |
| 4,627,311 A | * | 12/1986 | Yokooku et al. | 477/32 |
| 7,077,085 B2 | * | 7/2006 | Arai et al. | 123/90.16 |
| 2003/0106515 A1 | * | 6/2003 | Kondo | 123/179.4 |
| 2006/0037578 A1 | * | 2/2006 | Nakamura | 123/198 F |
| 2007/0062476 A1 | * | 3/2007 | Ota et al. | 123/179.4 |

FOREIGN PATENT DOCUMENTS

| | | |
|---|---|---|
| JP | 10-18879 A | 1/1998 |
| JP | 2008-75569 A | 4/2008 |
| KR | 10-2010-0012268 A | 2/2010 |

* cited by examiner

*Primary Examiner* — Willis R Wolfe, Jr.
*Assistant Examiner* — Anthony L Bacon
(74) *Attorney, Agent, or Firm* — Morgan, Lewis & Bockius LLP

(57) ABSTRACT

A control method and a control system for deceleration of a vehicle including a continuous valve lift apparatus (CVVL) may include determining whether fuel cutting condition is satisfied, determining whether brake pedal input signal is detected and controlling deceleration according to brake pedal input signal by at least one of controlling throttle opening angle and controlling valve lift of the CVVL.

2 Claims, 3 Drawing Sheets

CONTROL METHOD FOR DECELERATION OF VEHICLE INCLUDING CONTINUOUS VALVE LIFT APPARATUS AND SYSTEM FOR THE SAME

CROSS-REFERENCE TO RELATED APPLICATION

The present application claims priority to Korean Patent Application No. 10-2008-0123582 filed on Dec. 5, 2008, the entire contents of which are incorporated herein for all purposes by this reference.

BACKGROUND OF THE INVENTION

1. Field of the Invention

The present invention relates to a control method for deceleration of a vehicle and a system for the same. More particularly, the present invention relates to a control method for deceleration of a vehicle including a continuous valve lift apparatus and a system for the same.

2. Description of Related Art

In a recent vehicle, a controlling logic for stopping fuel injection (fuel cut-off) is in common use today for an engine control system in conditions that fuel injection is not required for enhancement of fuel consumption. The conditions may include a condition that a vehicle runs on a downhill road and an accelerator pedal is released, after that a throttle vale is controlled to be closed and fuel injection is stopped. In this case, pumping loss of an engine, as it is called an engine brake, is generated by closing the throttle valve, and thus vehicle speed is reduced.

However, rapid vehicle speed change induces bad effects to driving feeling and durability of a vehicle, so that throttle valve is not entirely closed. Thus, a small quantity of air keeps flowing into a cylinder. When fuel injection is stopped, combustion is not occurred, so that inflowing air may be supplied to a catalyst converter. In this case, the catalyst exposed to the air can be degraded, crack can be generated in the catalyst and purification of exhaust gas can be deteriorated rapidly.

The controlling logic for stopping fuel injection using air controlling may have trade off relationship between the pumping loss and degradation of the catalyst converter. However, if an engine equipped with a continuous variable valve lift (CVVL), which can control valve lift continuously, can be controlled effectively, the pumping loss can be reduced and inflowing air also can be controlled.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide control a method for deceleration of a vehicle including a continuous valve lift apparatus and a system for the same having advantages of effective controlling engine brake by controlling a throttle valve and valve lift according to engine driving conditions so that fuel consumption can be improved and a catalyst converter can be protected.

In an aspect of the present invention, the control method for deceleration of a vehicle including a continuous valve lift apparatus (CVVL) may include a) determining whether a fuel cutting condition is satisfied, b) determining whether a brake pedal input signal is detected in a case that the fuel cutting condition is satisfied, and c) controlling deceleration of the vehicle according to the brake pedal input signal by at least one of controlling a throttle opening angle and controlling a valve lift of the CVVL.

The control method of claim 1, may repeat the steps a) to c).

The determining of whether the fuel cutting condition is satisfied may be performed after concluding that an acceleration pedal is released.

The control method may include stopping a fuel injection when the fuel cutting condition is satisfied and may further include sensing the brake pedal input signal when the brake pedal input signal is detected, transforming the sensed brake pedal signal into a target throttle opening angle, and controlling a throttle valve according to the target throttle opening angle.

The control method may further include lowering the valve lift of the CVVL so as to decelerate the vehicle when the brake pedal input signal is not detected.

In another aspect of the present invention, the control method may further include determining whether brake pedal input signal is detected when the fuel cutting condition is not satisfied, sensing the brake pedal input signal when the brake pedal input signal is detected, transforming the sensed brake pedal signal into a target throttle opening angle, and controlling a throttle valve according to the target throttle opening angle.

The control method may further include determining a target throttle opening angle when the brake pedal input signal is not detected, controlling a throttle valve according to the target throttle opening angle, and lowering a valve lift of the CVVL so as to decelerate the vehicle.

In further another aspect of the present invention, the control system for deceleration of a vehicle including a continuous valve lift apparatus (CVVL) may include an accelerator pedal sensor, a brake pedal sensor, a throttle opening sensor, a fuel injection portion, a throttle opening control portion, a CVVL valve lift control portion, and an engine control unit (ECU) that receives vehicle operation conditions from a plurality of sensors including the accelerator pedal sensor, the brake pedal sensor and the throttle opening sensor and controls at least one of the fuel injection portion, the throttle opening control portion and the CVVL valve lift control portion in order to decelerate the vehicle.

The ECU may be programmed to perform, a) determining whether a fuel cutting condition is satisfied when an acceleration pedal releasing signal is detected, b) determining whether a brake pedal input signal is detected in a case that the fuel cutting condition is satisfied, and c) controlling deceleration of the vehicle according to the brake pedal input signal by at least one of controlling a throttle opening angle and controlling a valve lift of the CVVL.

The control system may repeat the steps a) to c).

The ECU may be programmed to further perform, stopping a fuel injection when the fuel cutting condition is satisfied, sensing the brake pedal input signal when the brake pedal input signal is detected after stopping the fuel injection and transforming the sensed brake pedal signal into a target throttle opening angle, and controlling a throttle valve according to the target throttle opening angle.

The ECU may be programmed to further perform, stopping a fuel injection when the fuel cutting condition is satisfied, and lowering a valve lift of the CVVL so as to decelerate the vehicle when the brake pedal input signal is not detected.

The ECU may be programmed to further perform, determining whether brake pedal input signal is detected when the fuel cutting condition is not satisfied, sensing the brake pedal input signal when the brake pedal input signal is detected and transforming the sensed brake pedal signal into a target throttle opening angle, and controlling a throttle valve according to the target throttle opening angle.

The ECU may be programmed to further perform, determining whether brake pedal input signal is detected when the fuel cutting condition is not satisfied, determining a target throttle opening angle when the brake pedal input signal is not detected, controlling a throttle valve according to the target throttle opening angle, and lowering a valve lift of the CVVL so as to decelerate the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
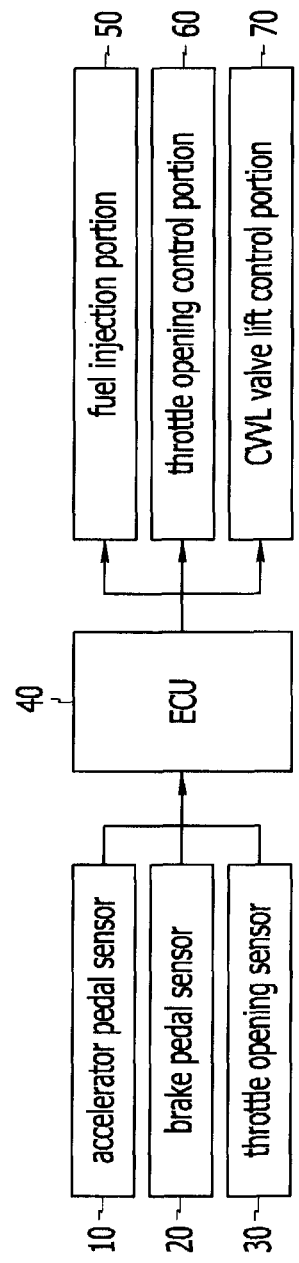
FIG. 1 is a drawing showing a system for deceleration of a vehicle including a continuous valve lift apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a drawing showing a system for deceleration of a vehicle including a continuous valve lift apparatus according to an exemplary embodiment of the present invention.

Referring to FIG. 1, a system for deceleration of a vehicle including a continuous valve lift apparatus according to an exemplary embodiment of the present invention includes an accelerator pedal sensor 10 that detects accelerator pedal accelerator pedal operation signal, a brake pedal sensor 20 that detects brake operation signal and a throttle valve sensor 30 that detects throttle valve opening signal, and an engine control unit (ECU 40) receives the signals from the accelerator pedal sensor 10, brake pedal sensor 20 and throttle valve sensor 30.

The ECU 40 using the signal showing vehicle operation states controls a fuel injection control apparatus 50, a throttle opening control apparatus 60 and a continuous variable valve lift valve lift control apparatus (CVVL) 70.

Figure 2:
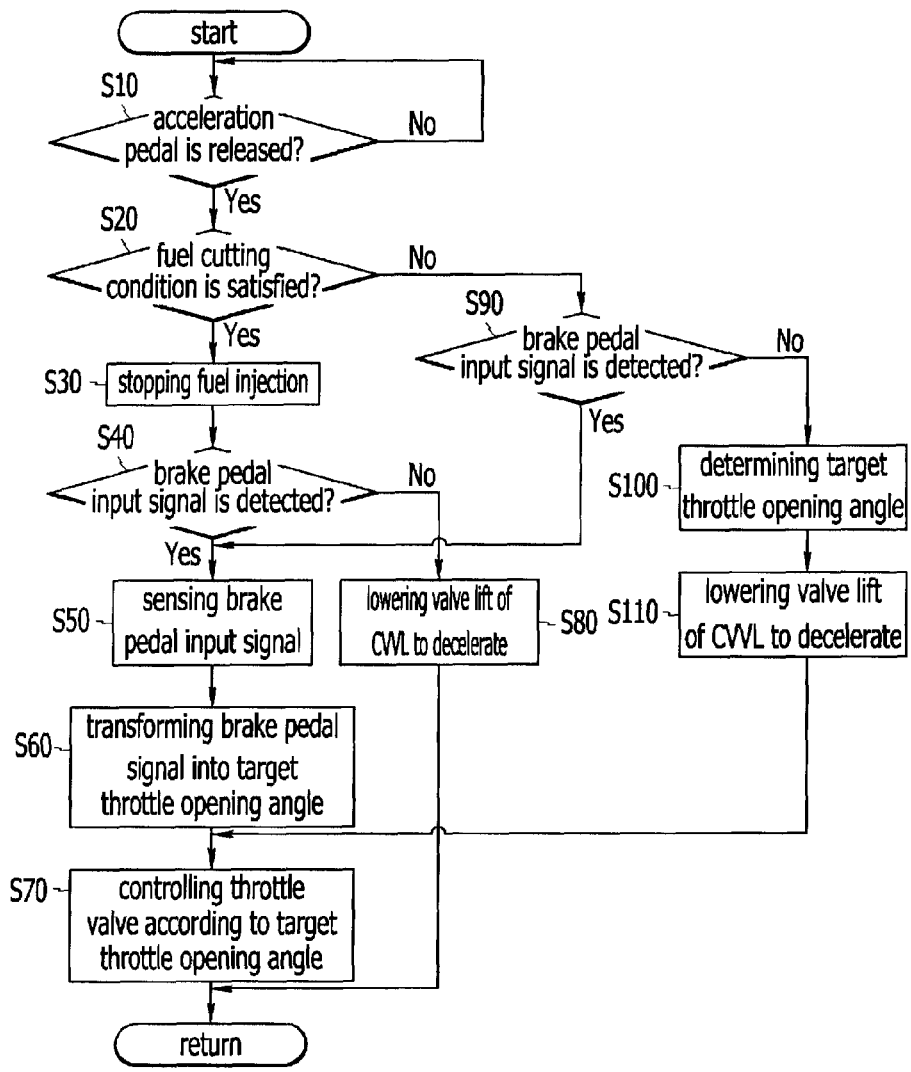
FIG. 2 is a flowchart of a method for deceleration of a vehicle including a continuous valve lift apparatus according to an exemplary embodiment of the present invention.

FIG. 2 is a flowchart of a method for deceleration of a vehicle including a continuous valve lift apparatus according to an exemplary embodiment of the present invention.

Referring to FIG. 2, a method for deceleration of a vehicle including a continuous valve lift apparatus according to an exemplary embodiment of the present invention includes determining an acceleration pedal is released S10 and determining whether fuel cutting condition is satisfied S20.

In this case, the process is performed by controlling of the ECU 40, and the determining an acceleration pedal is released S10 is performed for a first prediction of a driver to decelerate and the determining whether fuel cutting condition is satisfied S20 can be defined that a predetermined driving conditions is satisfied, and the predetermined driving conditions can be arbitrarily determined by a person of an ordinary skill in the art.

If it is determined that the fuel cutting condition is satisfied, fuel injection is stopped S30 and then it is determined whether brake pedal input signal is detected S40.

The brake pedal input signal can be interpreted of a secondary deceleration intention of a driver.

If it is determined that the brake pedal input signal is detected, the brake pedal input signal is sensed S50 and the brake pedal signal is transformed into target throttle opening angle S60 and throttle valve is controlled according to the target throttle opening angle S70.

That is, if the secondary deceleration intention of the driver is detected, input amount of the brake pedal signal is transformed to braking requirement and the braking requirement is performed by controlling throttle opening of the throttle valve. In this case, deceleration using an engine brake can realize stable braking and it can reduce operation of a braking system so that durability of the braking system can be expected.

If in the step S40 the brake pedal input signal is not detected, the CVVL is controlled to be lowered in order to decelerate S80.

That is, lowering of valve lift of the CVVL instead of closing the throttle valve can control air inflow to be reduced so that pumping loss can be reduced and vehicle speed can be maintained. Also, deterioration of the catalyst converter by inflowing of air, which is not combusted, can be prevented.

Figure 3:
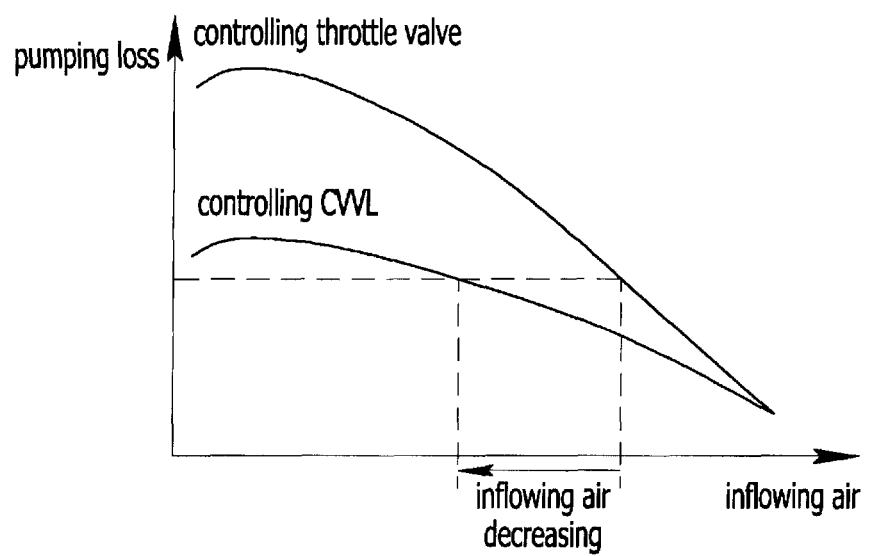
FIG. 3 is a graph showing relationship between inflow air amounts and pumping loss.

FIG. 3 is a graph showing relationship between inflow air amounts and pumping loss. As shown in FIG. 3, when controlling valve lift of the CVVL can reduce inflowing air comparing controlling throttle valve opening at the same pumping loss so that deterioration of the catalyst converter can be prevented.

If in the step S20 the fuel cutting condition is not satisfied, then it is determined whether brake pedal input signal is detected S9.

If it is determined that the brake pedal input signal is detected in step S90, it is determined that a driver has an intention of a secondary deceleration and the brake pedal input signal is sensed S50 and the brake pedal signal is transformed into target throttle opening angle S60 and throttle valve is controlled according to the target throttle opening angle S70. In this case, deceleration using an engine brake can realize stable braking and it can reduce operation of a braking system so that durability of the braking system can be expected too.

If it is determined that the brake pedal input signal is not detected in step S90, a target throttle opening angle is determined S100, and then throttle valve is controlled according to the target throttle opening angle S70 and simultaneously valve lift of the CVVL is controlled to be lowered S110.

The target throttle opening and the valve lift of the CVVL can be determined and controlled by a predetermined map according to driving conditions and the map including data can be can be arbitrarily determined by a person of an ordinary skill in the art so that detailed explanation will be omitted.

Hereinafter, a system for deceleration of a vehicle including a continuous valve lift apparatus according to an exemplary embodiment of the present invention will be described.

A system for deceleration of a vehicle including a continuous valve lift apparatus according to an exemplary embodiment of the present invention includes the accelerator pedal sensor 10, the brake pedal sensor 20, the throttle valve sensor 30 and the ECU 40 receiving the signals from the accelerator pedal sensor 10, the brake pedal sensor 20 and the throttle valve sensor 30.

The ECU 40 using the driving condition of the vehicle controls the fuel injection control apparatus 50, the throttle opening control apparatus 60 and CVVL 70.

The ECU 40 is programmed to perform the control method for deceleration of a vehicle including the CVVL and the operation of the ECU 40 is the same of the control method so that repeated explanation will be explained.

As described above, the control method for deceleration of a vehicle including the CVVL and the system for the same according to the exemplary embodiment of the present invention can prevent unnecessary deceleration by interpretation of the driver's intention so that fuel economy can be enhanced. Stable braking can be realized by controlling throttle opening according to driver's intention and limiting air inflow into the catalyst converter when fuel injection is stopped can protect the catalyst.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for deceleration of a vehicle including a continuous valve lift apparatus (CVVL) comprising:
   a) determining whether a fuel cutting condition is satisfied;
   b) determining whether a brake pedal input signal is detected when the fuel cutting condition is satisfied;
   c) controlling deceleration of the vehicle according to the brake pedal input signal by at least one of controlling a throttle opening angle and controlling a valve lift of the CVVL,
   wherein the determining of whether the fuel cutting condition is satisfied is performed after concluding that an acceleration pedal is released;
   stopping a fuel injection when the fuel cutting condition is satisfied; sensing the brake pedal input signal when the brake pedal input signal is detected; transforming the sensed brake pedal signal into a first target throttle opening angle; and controlling a throttle valve according to the first target throttle opening angle;
   lowering the valve lift of the CVVL so as to decelerate the vehicle when the fuel cutting condition is satisfied and the brake pedal input signal is not detected;
   determining whether the brake pedal input signal is detected when the fuel cutting condition is not satisfied sensing the brake pedal input signal when the brake pedal input signal is detected, transforming the sensed brake pedal signal into a second target throttle opening angle, and controlling the throttle valve according to the second target throttle opening angle; and
   determining a third target throttle opening angle when the fuel cutting condition is not satisfied and the brake pedal input signal is not detected; lowering the valve lift of the CVVL so as to decelerate the vehicle; and controlling the throttle valve according to the third target throttle opening angle.

2. A control system for deceleration of a vehicle including a continuous valve lift apparatus (CVVL) comprising:
   an accelerator pedal sensor;
   a brake pedal sensor;
   a throttle opening sensor;
   a fuel injection portion;
   a throttle opening control portion;
   a CVVL valve lift control portion; and
   an engine control unit (ECU) that receives vehicle operation conditions from a plurality of sensors including the accelerator pedal sensor, the brake pedal sensor and the throttle opening sensor and controls at least one of the fuel injection portion, the throttle opening control portion and the CVVL valve lift control portion in order to decelerate the vehicle;
   wherein the ECU is programmed to perform:
   a) determining whether a fuel cutting condition is satisfied when an acceleration pedal releasing signal is detected;
   b) determining whether a brake pedal input signal is detected when the fuel cutting condition is satisfied; and
   c) controlling deceleration of the vehicle according to the brake pedal input signal by at least one of controlling a throttle opening angle and controlling a valve lift of the CVVL;
   wherein the ECU is programmed to further perform:
   stopping a fuel injection when the fuel cutting condition is satisfied;
   sensing the brake pedal input signal when the brake pedal input signal is detected after stopping the fuel injection and transforming the sensed brake pedal signal into a first target throttle opening angle; and
   controlling a throttle valve according to the first target throttle opening angle;
   wherein the ECU is programmed to further perform:
   stopping the fuel injection when the fuel cutting condition is satisfied; and
   lowering the valve lift of the CVVL so as to decelerate the vehicle when the fuel cutting condition is satisfied and the brake pedal input signal is not detected;
   wherein the ECU is programmed to further perform:
   determining whether the brake pedal input signal is detected when the fuel cutting condition is not satisfied;
   sensing the brake pedal input signal when the brake pedal input signal is detected and transforming the sensed brake pedal target throttle opening angle; and
   controlling the throttle valve according to the second target throttle opening angle; and wherein the ECU is programmed to further perform:
   determining whether the brake pedal input signal is detected when the fuel cutting condition is not satisfied;
   determining a third target throttle opening angle when the fuel cutting condition is not satisfied and the brake pedal input signal is not detected;
   controlling the throttle valve according to the third target throttle opening angle; and
   lowering the valve lift of the CVVL so as to decelerate the vehicle.

\* \* \* \* \*